United States Patent
Bloom (10) Patent No.: US 7,277,216 B2
(45) Date of Patent: Oct. 2, 2007

(54) DIFFERENTIAL INTERFEROMETRIC LIGHT MODULATOR AND IMAGE DISPLAY SYSTEM

(75) Inventor: David M. Bloom, Jackson, WY (US)

(73) Assignee: Alces Technology, Jackson, WY (US)

(*) Notice: Subject to any disclaimer, the term of this patent is extended or adjusted under 35 U.S.C. 154(b) by 73 days.

(21) Appl. No.: 11/161,452

(22) Filed: Aug. 3, 2005

(65) Prior Publication Data
US 2006/0114543 A1     Jun. 1, 2006

Related U.S. Application Data

(63) Continuation-in-part of application No. 10/904,766, filed on Nov. 26, 2004, now Pat. No. 7,054,051.

(51) Int. Cl.
*G02F 1/01* (2006.01)
(52) U.S. Cl. ........................ 359/276; 359/291
(58) Field of Classification Search ............... 359/291, 359/276, 279
See application file for complete search history.

(56) References Cited

U.S. PATENT DOCUMENTS

| | | |
|---|---|---|
| 4,710,732 A | 12/1987 | Hornbeck |
| 4,758,092 A | 7/1988 | Heinrich |
| 5,311,360 A | 5/1994 | Bloom |
| 5,982,553 A | 11/1999 | Bloom |
| 6,088,102 A | 7/2000 | Manhart |
| 6,466,354 B1 | 10/2002 | Gudeman |
| 6,724,515 B1 | 4/2004 | Kowarz |
| 7,054,051 B1* | 5/2006 | Bloom ................. 359/276 |
| 2006/0114544 A1* | 6/2006 | Bloom et al. ......... 359/279 |
| 2006/0238851 A1* | 10/2006 | Bloom ................. 359/279 |

OTHER PUBLICATIONS

M. Francon, Optical Interferometry, Academic Press, New York, 1966; chapter VII, "Polarization Interferometers".
M. Francon and S. Mallick, Polarization Interferometers, John Wiley & Sons, New York, 1971; chapter 1, "Introduction to Polarized Light" and chapter 2, "Birefringent Beam-splitters".

* cited by examiner

*Primary Examiner*—Scott J. Sugarman
(74) *Attorney, Agent, or Firm*—Morrison Ulman (57) ABSTRACT

A differential interferometric light modulator and image display system comprises a polarizing beam splitter, a polarization displacement device and a linear array of MEMS optical phase shifting devices to modulate a line image. The polarizing beam splitter acts as both the polarizer and the analyzer in an interferometer. The polarization displacement device divides polarized light from a polarizer into orthogonal polarization components which propagate parallel to one another. The MEMS optical phase shifting device array imparts a relative phase shift onto the polarization components and returns them to the polarization displacement device where they are recombined and sent to the analyzer. The MEMS optical phase shifting devices are electronically controlled and convert electronic image data into actual light modulation.

12 Claims, 6 Drawing Sheets

Fig. 1

FIG. 1A
PERSPECTIVE VIEW

DIFFERENTIAL INTERFEROMETRIC LIGHT MODULATOR AND IMAGE DISPLAY SYSTEM

RELATED APPLICATIONS

This application is a continuation-in-part of U.S. Ser. No. 10/904,766, filed on Nov. 26, 2004, now U.S. Pat. No. 7,054,051 incorporated herein by reference.

TECHNICAL FIELD

The invention relates generally to visual display devices and light modulator systems. In particular it relates to differential interferometric light modulator systems containing optical polarization-sensitive devices.

BACKGROUND

Display devices such as television sets and movie projectors often incorporate a modulator for the purpose of distributing light into a two-dimensional pattern or image. For example, the frames of a movie reel modulate white light from a projector lamp into shapes and colors that form an image on a movie screen. In modern displays light modulators are used to turn on and off individual pixels in an image in response to electronic signals that control the modulator.

Texas Instruments introduced a microelectromechanical, integrated circuit chip, light modulator called a digital mirror device which includes millions of tiny mirrors on its surface. Each mirror corresponds to a pixel in an image and electronic signals in the chip cause the mirrors to move and reflect light in different directions to form bright or dark pixels. See, for example, U.S. Pat. No. 4,710,732 incorporated herein by reference. Stanford University and Silicon Light Machines developed a microelectromechanical chip called a grating light modulator in which diffraction gratings can be turned on and off to diffract light into bright or dark pixels. See, for example, U.S. Pat. No. 5,311,360 incorporated herein by reference.

Both of these reflective and diffractive light modulation schemes for displays involve two-dimensional arrays of light modulator elements. However, it is also possible to make a display in which light is incident on a linear array of high speed light modulators. With appropriate magnifying optics and scanning mirrors, a linear array can be made to appear two-dimensional to an observer. Through the scanning action of a vibrating mirror a single row of light modulators can be made to do the work of as many rows of modulators as would be necessary to provide a real two-dimensional display of the same resolution. See, for example, U.S. Pat. No. 5,982,553 incorporated herein by reference.

Manhart introduced a display apparatus including a grating light-valve array and interferometric optical system. See U.S. Pat. No. 6,088,102 incorporated herein by reference. In Manhart a display system employs a planar grating light-valve (GLV) array as a spatial light modulator for representing an image to be displayed. The system relies for image representation on the position of moveable reflective elements of the GLV array, which move through planes parallel to the plane of the array. The moveable elements provide, from an incident phase-contrast wavefront, a reflected phase-modulated wavefront representing the image to be displayed. The displayed image is provided by inter-ferometrically combining the phase-modulated wavefront with a reference wave-front also formed, directly or indirectly, from the incident phase-contrast wavefront.

Many microelectromechanical light modulators are compatible with digital imaging techniques. Digital information may be sent electronically to the modulator. For example, gray scale images may be achieved by turning pixels on only part time. A pixel that is switched from bright to dark with a 50% duty cycle will appear to an observer to have a constant intensity half way between bright and dark. However, the pixel must be switched between bright or dark states faster than the human eye's critical flicker frequency of roughly 30 Hz or else it will appear to flicker. Therefore two-dimensional digital light modulators for displays must switch between states quickly to display a range of light levels between bright and dark.

A one-dimensional digital light modulator array, scanned by a vibrating mirror to make it appear two-dimensional, must incorporate modulators with fast switching speeds. Each modulator element must switch on and off quickly to provide the impression of gray scale and this action must be repeated for each pixel in a line within the scanning period of the mirror. Grating light modulator devices in particular exhibit high switching speeds because their mechanical elements move only very short distances. The grating light modulator incorporates parallel ribbon structures in which alternating ribbons are deflected electrostatically to form diffraction gratings. The ribbons need only move a distance of one quarter wavelength of light to switch a grating on or off. It is also possible (and desirable in many instances) to operate one- or two-dimensional light modulators in analog, rather than digital, modes.

One limitation of the grating light modulator is that at least two ribbons are required in order to form a diffractive modulator element. Therefore each pixel requires at least two ribbons each of which uses up valuable space on a chip. Another limitation of grating light modulators is that they require collimated light sources. Gudeman proposed an interferometric light modulator based on a mechanical structure very similar to the grating light modulator; see U.S. Pat. No. 6,466,354 incorporated herein by reference. Gudeman's light modulator is a form of Fabry-Perot interferometer based on a ribbon structure.

Microelectromechanical light modulators typified by the Texas Instruments' digital mirror device and Stanford/Silicon Light Machines grating light modulator devices mentioned above have already enjoyed wide commercial success and have spawned other related designs. See, for example, U.S. Pat. No. 6,724,515 incorporated herein by reference. However, they are not without limitations and there is room for improvement.

The digital mirror device is comparatively slow and therefore is usually supplied as a two-dimensional mirror array. Usually two dimensional modulator arrays are more expensive to make than one-dimensional arrays and require a sophisticated addressing scheme for the mirrors. A two-dimensional array requires defect-free manufacturing of N×N pixels over a large chip area while a one-dimensional array with the same image resolution requires only N working pixels on a chip in a single line.

Grating light modulator devices, while very fast, require more than one ribbon structure per pixel as noted above. They are also affected by limitations due to diffraction. A grating light modulator has a reflective state or configuration and a diffractive state. In the diffractive state incoming light is diffracted into the +1 and −1 diffraction orders of an optical grating. However, only about 80% of the light is collected in these two orders. Light diffracted into higher orders is lost and overall light efficiency suffers.

Grating-based devices use high numerical aperture optical elements to collect diffracted light. It would be desirable for a modulator to be able to use simpler, low numerical aperture optics. Grating-based devices also have some difficulty achieving high contrast in the dark state; i.e. displaying black areas in an image. A light modulator that escaped as many of the limitations of existing modulator designs as possible would be highly desirable.

An interferometric light modulator that has many desirable features was disclosed in "Differential interferometric light modulator and image display device," U.S. Ser. No. 10/904,766 filed on Nov. 26, 2004, incorporated herein by reference. That device features high speed, high contrast and is compatible with relatively low numerical aperture optics. Additionally each pixel in the displayed image depends on only one MEMS ribbon (or other phase shifting structure) so valuable chip real estate is saved. The interferometric design means that light is not lost in higher diffractive orders as can be a problem in diffractive devices.

Further improvement is always possible, however. The simplest improvement to understand conceptually would be a design that lends itself to compact construction. More subtle advances might involve different ways of manipulating polarized light and improvement of optical parameters such as field-of-view. Additionally variations on MEMS devices for imparting optical phase shifts are desirable in different applications.

SUMMARY

According to an aspect of the invention a differential interferometric light modulator and image display system comprises a polarizing beam splitter, a polarization displacement device and a MEMS optical phase shifting device. Preferably a linear array of MEMS optical phase shifting devices serves to modulate a line of pixels in the display. The polarizing beam splitter acts as both the polarizer and the analyzer in an interferometer. The polarization displacement device divides polarized light from a polarizer into orthogonal polarization components which propagate parallel to one another. The MEMS optical phase shifting device, or array of such devices, imparts a relative phase shift onto the polarization components and returns them to the polarization displacement device where they are recombined and sent to the analyzer. The MEMS optical phase shifting devices are electronically controlled and convert electronic image data (light modulation instructions) into actual light modulation.

BRIEF DESCRIPTION OF THE DRAWINGS

The drawings are heuristic for clarity. The foregoing and other features, aspects and advantages of the invention will become better understood with regard to the following descriptions, appended claims and accompanying drawings in which:

DETAILED DESCRIPTION

An aspect of the invention provides a novel light modulator and image display system such as might be used to project images on a screen for viewing. Alternatively, images may be created so that a person can view them by looking into an eyepiece. In either case the appearance of a two-dimensional image is created by scanning a line image fast enough that a human cannot detect the scanning motion.

In some applications, such as printing, the object on which the line image is projected is scanned rather than the line image itself. For example, to print a picture it might turn out to be more convenient to move a piece of paper in front of a stationary line image. In these cases, since a human observer is not involved in the printing process, the speed at which the object is scanned in front of the line image is a matter of engineering choice. Faster is normally better, but there is no minimum speed set by human physiology.

Figure 1:
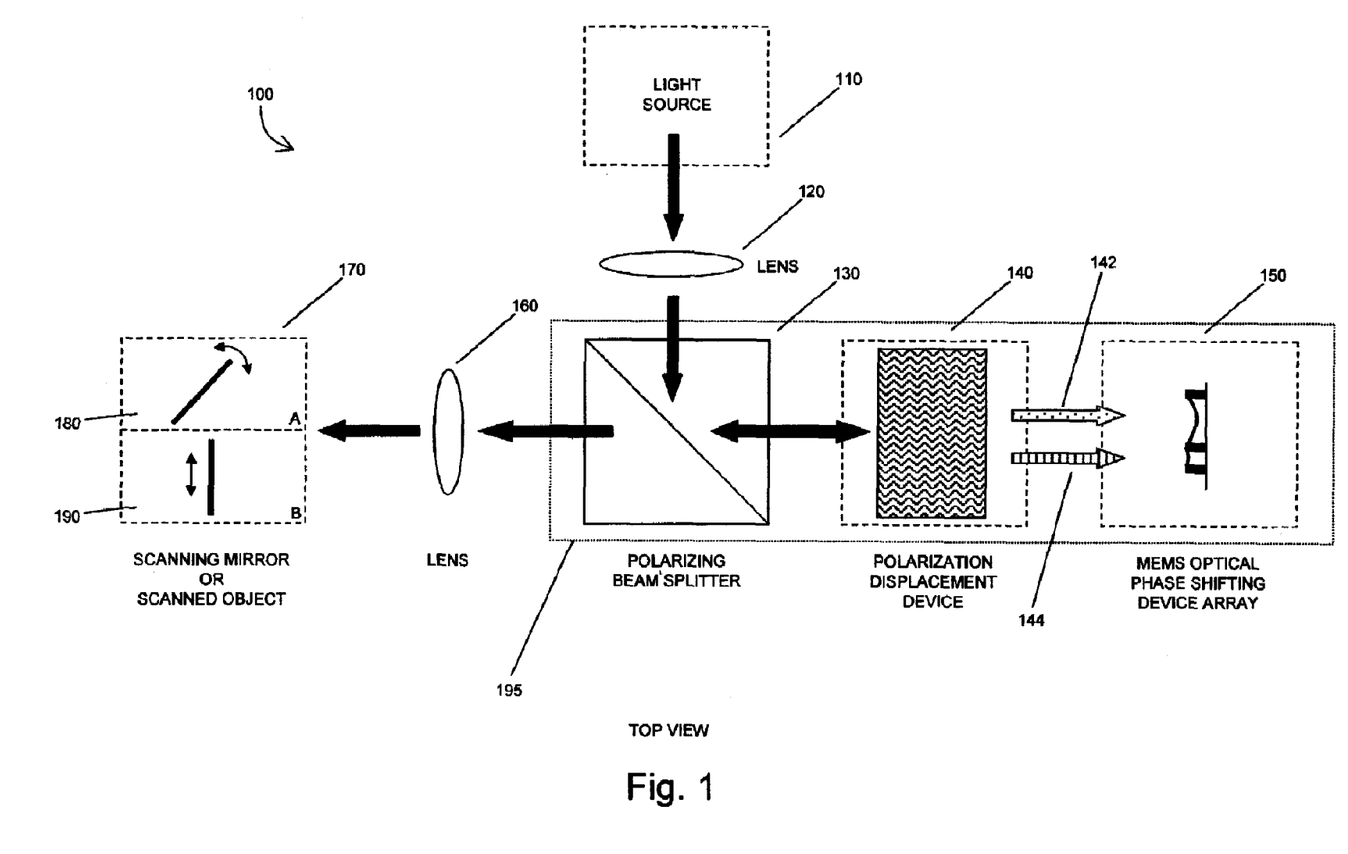
FIG. 1 shows an image display system.

FIG. 1 shows a schematic diagram of a display system 100 according to an aspect of the invention. In the figure a light source 110, polarizing beam splitter 130, polarization displacement device 140, MEMS optical phase shifting device array 150, and an object 170 (represented by scanning mirror 180 or scanned object 190) are shown. Also shown are lenses 120 and 160 and several thick arrows indicating propagating light. Thin arrows within panels A and B of object 170 suggest the scanning motion of scanning mirror 180 or scanned object 190.

Many of the parts of the display system are available in different forms. For example, there are several possible polarization displacement devices, MEMS optical phase shifting device arrays, polarizing beam splitters, light sources and lenses. Aspects of the invention are illustrated in preferred embodiments with specific forms for various parts of the display system. However, aspects of the invention encompass not only the specific forms of components shown in particular embodiments, but also other possible forms that manipulate light in the same way. Several examples of component forms are described here. Other component forms not described are, of course, possible and in some applications may be just as suitable as those described here.

Figure 2A:
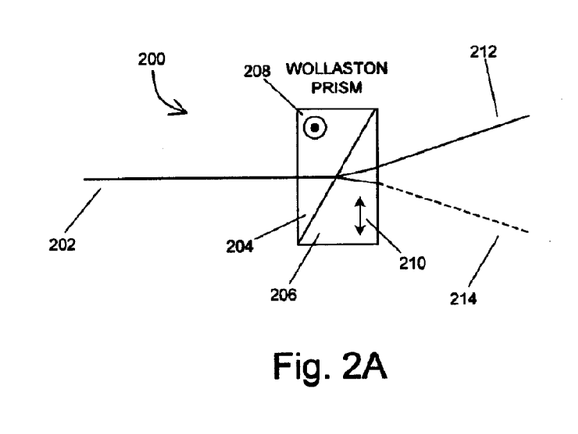
FIGS. 2A-2D show various polarization displacement devices.
Figure 2B:
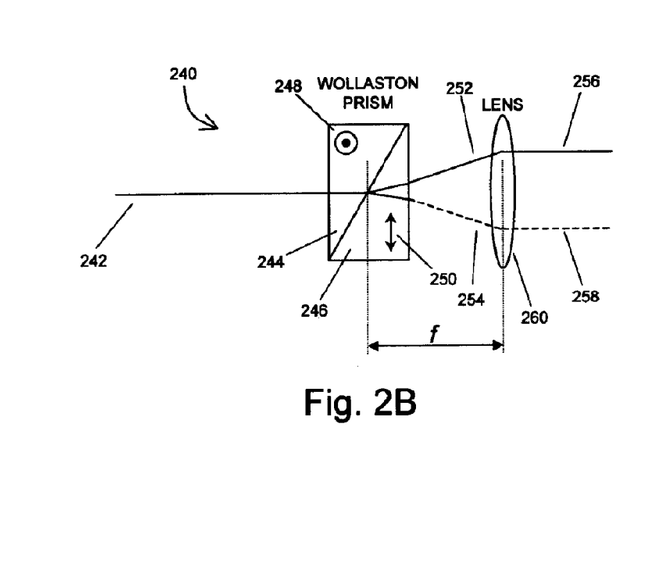
Figure 2C:
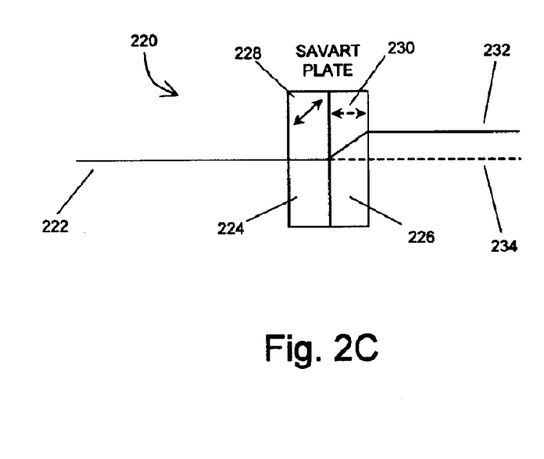
Figure 2D:
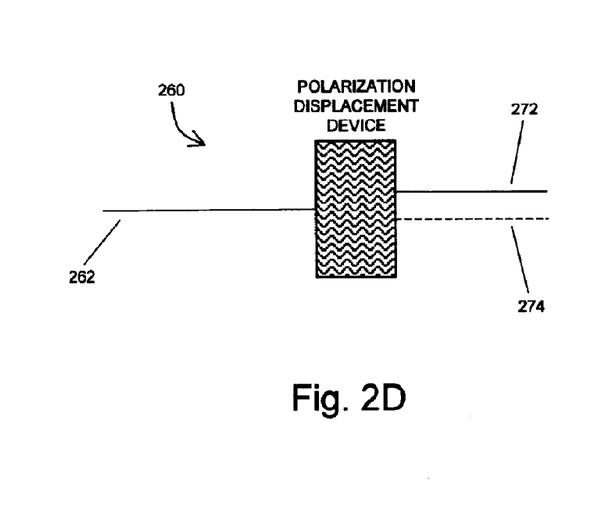
Figure 3A:
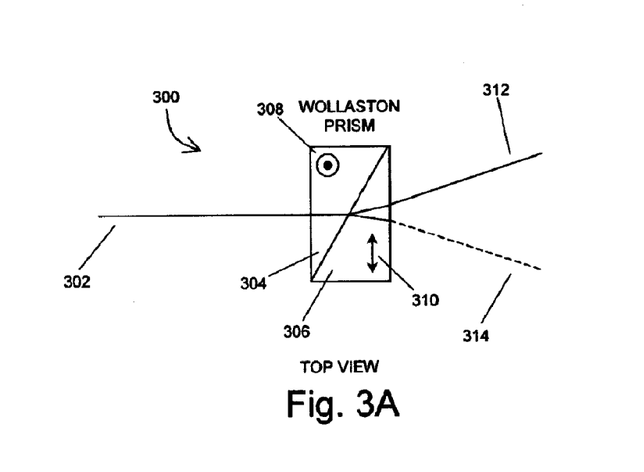
FIGS. 3A-3D illustrate a method of increasing the field-of-view of a polarization displacement device.
Figure 3B:
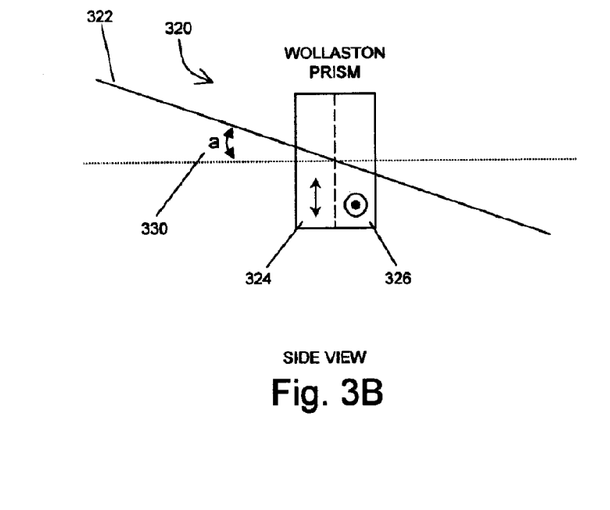
Figure 3C:
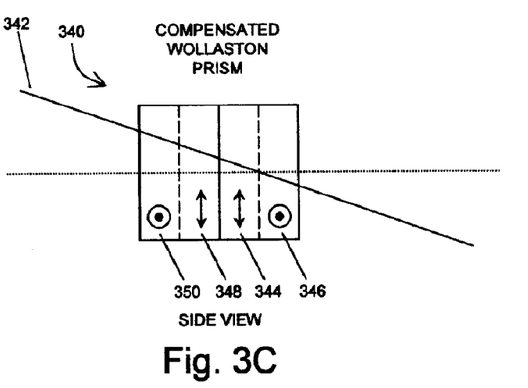

In FIG. 1 polarization displacement device 140 represents a class of equivalent components some possible variations and enhancements of which are shown in FIGS. 2 and 3. Similarly, in FIG. 1 MEMS optical phase shifting device array 150 represents an array comprising any of a class of MEMS devices some possible variations of which are shown in FIG. 4. According to an aspect of the invention a differential interferometric image display device may be constructed from components within classes of components whose members are defined by how they manipulate or modify the propagation of light.

The overall operation of an image display device may be appreciated by referring to FIG. 1. Light from light source 110 is optionally shaped and focused by lens 120 before entering polarizing beam splitter 130. In most cases the light is elongated in one direction transverse to the direction of propagation for efficiency in illuminating a linear array of MEMS optical phase shifting devices. The polarization of the light from light source 110 is such that the light is reflected by polarizing beam splitter 130 toward polarization displacement device 140. Polarization displacement device 140 splits an incoming light beam into two orthogonally polarized beams which are displaced perpendicular to their direction of propagation but still travel parallel to one another. These light beams are incident upon and reflected from a MEMS optical phase shifting device array 150.

After reflection from the MEMS optical phase shifting device array 150 the light beams retrace their paths back to polarization displacement device 140 where they are recombined before re-entering polarizing beam splitter 130. The polarization of the recombined beam may now be different from what it was when the light left the polarizing beam splitter on the way to the polarization displacement device. The reason the polarization may be different is that MEMS optical phase shifting device array 150 imparts different phase shifts to the orthogonal polarization components of the light thereby causing a change in the polarization of the recombined beam. Depending on the polarization state of the recombined beam the light either passes straight through polarizing beam splitter 130 toward lens 160 or is reflected back toward lens 120.

A detailed description of how the polarization of light is transformed by phase shifting its polarization components with a MEMS optical phase shifting device was presented in "Differential interferometric light modulator and image display device," U.S. Ser. No. 10/904,766 filed on Nov. 26, 2004, incorporated herein by reference.

Light that passes straight through polarizing beam splitter 130 is focused by projection lens 160 either onto scanning mirror 180 or onto scanned object 190. Scanning mirror 180 scans a line image on a screen (not shown) or a viewer's retina (not shown) to form a two dimensional image. In different applications, such as printing, scanned object 190 moves while the line image projected from lens 160 remains stationary. In either case a two dimensional image is formed when a line image is scanned relative to an object or viewing screen. It does not matter whether the light is scanned and the object is stationary or vice versa. It is sometimes desirable for the light and the object to be scanned in opposite directions with respect to some other fixed reference.

Figure 1A:
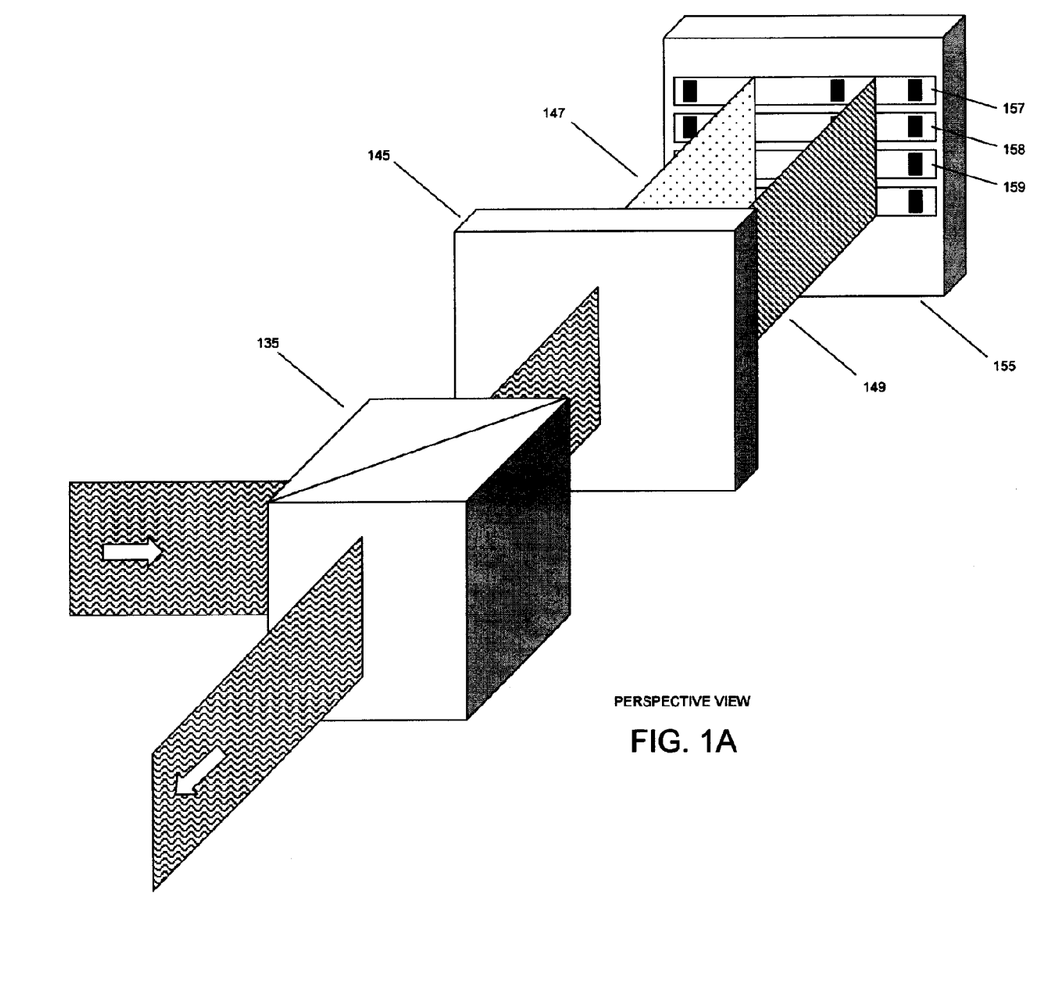
FIG. 1A is a perspective view of part of the system shown in FIG. 1.

FIG. 1A is a perspective view of part of the system shown in FIG. 1. The perspective view is provided to emphasize that in a preferred embodiment light propagates within the image display system in beams of elongated transverse dimension; i.e. thin ribbons of light rather than round pencils. Light beams shaped in this way are advantageous for illuminating linear arrays of MEMS optical phase shifting devices so that a line image of pixels is created which may later be scanned to create a two-dimensional image.

FIG. 1A shows in perspective the part of FIG. 1 enclosed within dotted boundary 195. It comprises polarizing beam splitter 130 or 135, polarization displacement device 140 or 145 and MEMS optical phase shifting device array 150 or 155.

In FIG. 1A light beam 125 is drawn as a thin ribbon of light. The beam maintains this elongated transverse profile as it travels through various optical components and even when it is split into orthogonally polarized beams 147 and 149. Of course an actual light beam would not need to have the perfect ribbon profile as drawn. An elongated ellipse serves just as well, for example. The beam shape must be sufficient to illuminate a linear array of MEMS optical phase shifting devices 150 or 155.

In FIG. 1A individual MEMS optical phase shifting devices 157, 158 and 159 are shown as representative elements of linear array 155. Light beams 147 and 149 illuminate many (preferably all) of the elements in the array simultaneously. The linear array of MEMS optical phase shifting devices modulates the light to create a line image. The line image is later projected on a scanned object or scanned across a screen by a scanning mirror to create a two-dimensional image.

FIGS. 1 and 1A show that according to an aspect of the invention a differential interferometric light modulator and image display device comprises a polarizing beam splitter (e.g. 130 or 135), a polarization displacement device (e.g. 140 or 145) and a MEMS optical phase shifting device. Preferably a linear array of MEMS optical phase shifting devices (e.g. 150 or 155) serves to modulate a line of pixels in the display. The polarizing beam splitter acts as both the polarizer and the analyzer in an interferometer. The polarization displacement device divides polarized light from a polarizer into orthogonal polarization components which propagate parallel to one another. The MEMS optical phase shifting device, or array of such devices, imparts a relative phase shift onto the polarization components and returns them to the polarization displacement device where they are recombined and sent to the analyzer. The MEMS optical phase shifting devices are electronically controlled and convert electronic image data (light modulation instructions) into actual light modulation.

In "Differential interferometric light modulator and image display device," (U.S. Ser. No. 10/904,766 filed on Nov. 26, 2004, incorporated herein by reference) a system similar to that shown in FIG. 1 was described. In that system a Wollaston, Rochon, Senarmont or other prism in combination with a lens served as a polarization displacement device and three possible MEMS optical phase shifting devices, representing broad classes of such devices, were presented. Aspects of the present invention include extensions and improvements of the differential inteferometric light modulator and image display device including more convenient and compact polarization displacement devices and more possible designs for MEMS optical phase shifting devices.

Polarization displacement device 140 is a key component in the image display system shown in FIG. 1. Its function is to split an incoming beam into polarization components and to displace those components laterally into parallel beams. As described in U.S. Ser. No. 10/904,766 this may be accomplished with, for example, a Wollaston prism and a lens. The Wollaston prism separates polarization components and imparts an angular separation between them; the lens converts the angular separation into a lateral displacement.

A more compact design for a polarization displacement device is possible using a walkoff crystal such as a Savart plate. A Savart plate relies on the principle of group velocity walkoff to separate polarization components and displaces them laterally without need for a lens. FIG. 2 shows various polarization displacement devices.

In FIG. 2A a Wollaston prism is shown. FIG. 2B shows a Wollaston prism in combination with a lens placed one focal distance away. FIG. 2C shows a Savart plate. FIG. 2D shows a generalized polarization displacement device.

The Wollaston prism shown in FIG. 2A splits incoming light beam 202 into orthogonally polarized components 212 and 214. Light beams 212 and 214 propagate away from each other indefinitely since they exit the prism at different angles.

FIG. 2B shows a lens 260 placed one focal length away from a Wollaston prism. This situation is similar to that shown in FIG. 2A except that the orthogonally polarized light beams 256 and 258 exiting the system are parallel to one another. It is desirable that polarization displacement device 140 of FIG. 1 have this property, namely that light beams leave it parallel to one another. That way the beams retrace their path upon reflection from MEMS optical phase shifting device 150. If light beams 142 and 144 diverged appreciably from one another it would be more complicated to recombine them on their return trip through polarization displacement device 140.

It is normally advantageous to replace two optical components with one whenever possible. Such a replacement is accomplished by the Savart plate illustrated in FIG. 2C. A Savart plate is an example of a walkoff crystal which imparts lateral displacement on polarization components of light incident upon it. (A Wollaston prism is an example of a birefringent prism which imparts angular separation on polarization components.) In FIG. 2C input light beam 222 is divided into orthogonally polarized components 232 and 234. Savart plate 220 is composed of two pieces of material 224 and 226 with optic axes oriented as shown by arrows 228 and 230. Arrow 230 is dashed to indicate that it does not lie in the plane of the page; in fact, it forms a 45 degree angle with the plane of the page.

Other arrangements of birefringent plates may also be used. Francon, for example, introduced a modified Savart plate in which two identical plates are cut at 45 degrees to the optic axis with their principal sections parallel. The two optic axes are perpendicular to each other and a half-wave plate with its privileged directions 45 degrees to the privileged directions of the plates is placed between them. The Savart plate as modified by Francon imparts twice the lateral displacement upon the emerging polarization components compared to a simple walkoff plate.

In general any device can be used as a polarization displacement device as long as it has the effect shown in FIG. 2D. An incoming light beam 262 is separated into two parallel light beams 272 and 274 which are polarized orthogonal to one another. Equivalently, if polarized light beams 272 and 274 are considered the input, then the device combines them into one beam 262. The polarization of beam 262 is then determined by the relative phase of the polarization components of beams 272 and 274.

As described here and in U.S. Ser. No. 10/904,766, a polarization displacement device may be made from a Wollaston, Rochon or Senarmont prism in combination with a lens, a Savart plate or a modification thereof, or any other optical components which have the same effect. For example, a Jamin interferometer is also a polarization displacement device as are designs by Steel and Tsuruta. See "Optical Interferometry" (especially chapter 7) by M. Francon (Academic Press, New York, 1966) and "Polarization Interferometers" (especially chapter 2) by M. Francon and S. Mallick (John Wiley & Sons, New York, 1971) both of which are incorporated herein by reference.

It may be appreciated from FIGS. 1 and 1A that it is desirable for polarization displacement device 140 or 145 to have a large field of view. FIGS. 3A-3D illustrate a method of increasing the field-of-view of a polarization displacement device. In FIG. 3A a Wollaston prism is illustrated from the same point of view that the polarization displacement device is shown in FIG. 1. FIG. 3B shows the same Wollaston prism from the side. FIG. 3C shows a compensated Wollaston prism while FIG. 3D, panels (i) and (ii), show qualitatively the indicatrices for the various components of a Wollaston and compensated Wollaston prism respectively.

In FIGS. 3A and 3B light ray 302 and 322 are the same ray viewed from the top and side respectively. The views in FIGS. 3A and 3B are both perpendicular to the direction of propagation of ray 302/322. In FIG. 3B, however, ray 322 is incident on the surface of the Wollaston prism at an angle "a" (item 330) from the normal to the surface. Angle "a" is a design consideration in an image display system according to an aspect of the invention because it is related to the field of view required to illuminate a linear MEMS optical phase shift device array.

In the section of the Wollaston prism indicated by 326, ray 322 is always perpendicular to the optic axis even as angle "a" (item 330) is varied. In the section of the prism indicated by 324, however, the angle between ray 322 and the optic axis is proportional to angle "a". This means that rays at the edge of the field of view (for example, corresponding to pixels at the ends of a MEMS optical phase shift device array) do not experience the same relative phase shift between polarization components as do rays near the normal axis. A design for a compensated Wollaston prism that removes this problem at least to first order is shown in FIG. 3C. Compensated Wollaston 340 is comprised of four plates 344, 346, 348 and 350 with optic axes oriented as shown in the figure. Plate 348 is made from a uniaxial material of the opposite sign as that of plate 344. In other words, if $n_e > n_o$ in one material then the other material is one in which $n_o > n_e$.

Figure 3D:
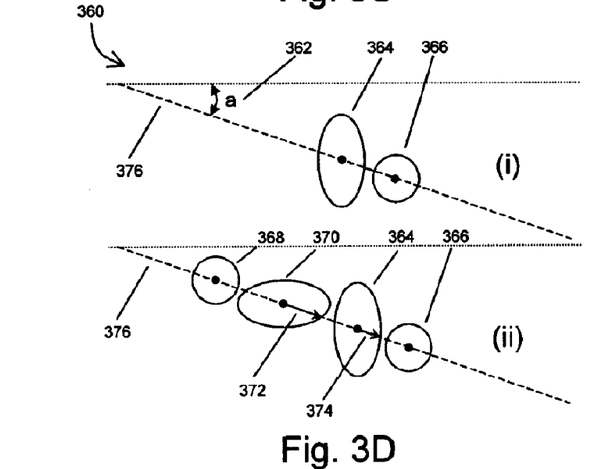
Figure 4:
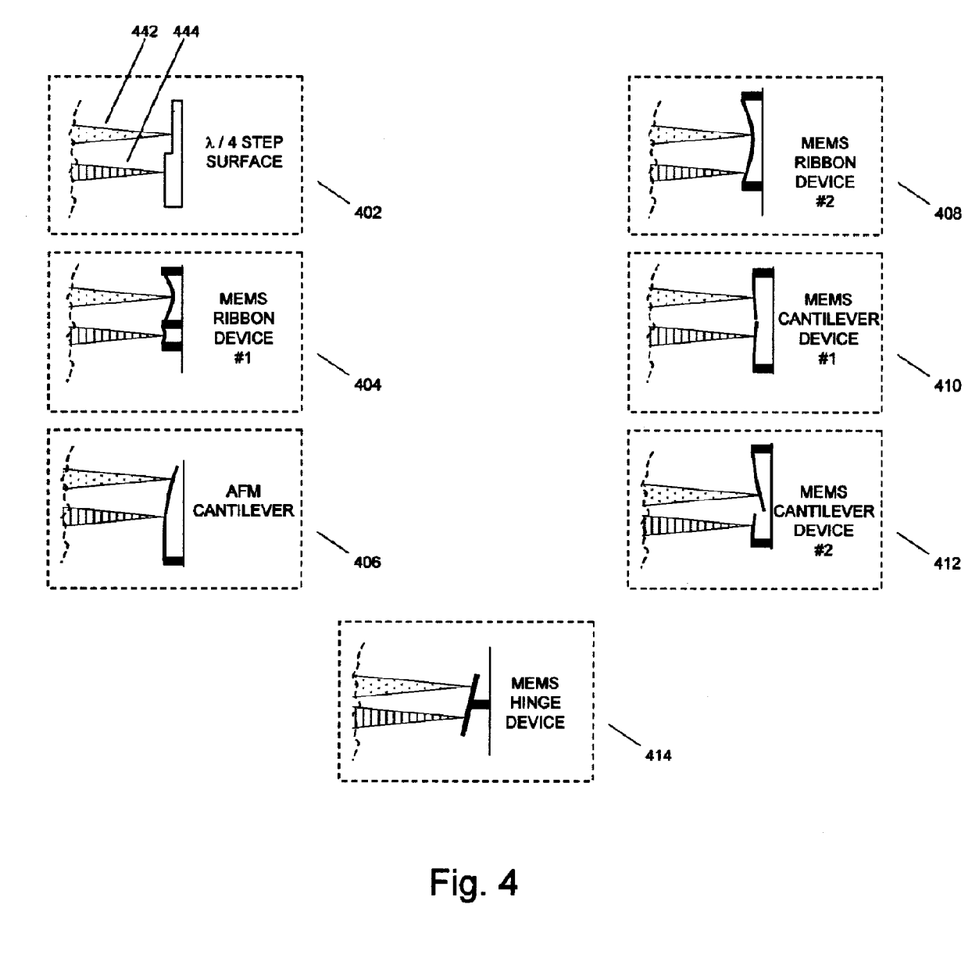
FIG. 4 shows an assortment of MEMS optical phase shifting devices.

FIG. 3D shows qualitatively indicatrices for a Wollaston (panel (i)) and a compensated Wollaston (panel (ii)) prism. In both panels dashed line 376 represents the direction of propagation of a ray through the prism corresponding to rays 322 and 342 in FIGS. 3B and 3C respectively. As before, the direction of ray propagation makes an angle "a" (item 362) with respect to the normal surface of the prism. 364 and 366 represent sections of the indicatrix for Wollaston 320 while 368 and 370 represent sections of the indicatrix for compensated Wollaston 340. Arrows 372 and 374 show how a ray propagating along line 376 intersects indicatrices 370 and 364 respectively at different radii.

In FIG. 3D it is apparent that a change in angle "a" (item 362) does not affect the radius at which ray 376 intersects indicatrices 368 or 366 as their sections are circular. However, a change in angle "a" does change the radius at which ray 376 intersects the section of indicatrices 364 and 370. In the uncompensated Wollaston of FIG. 3B whose indicatrices are shown in FIG. 3D, panel (i), this leads to undesirably varying phase shifts as angle "a" changes. In the compensated Wollaston of FIG. 3C whose indicatrices are shown in FIG. 3D, panel (ii), however, a change in angle "a" tends to make radius 372 longer and radius 374 shorter or vice versa. In other words, plate 348 compensates for plate 344 because the sign of its uniaxial birefringence is opposite.

The principle of field-of-view compensation just described is general and compensation schemes can be designed for other birefringent plates. Field-of-view compensation is increasingly important as the length of the linear array of MEMS optical phase shifting devices becomes greater.

FIG. 4 shows an assortment of MEMS optical phase shifting devices. Each device is a single element of an array of like devices. These linear arrays extend in a direction perpendicular to the plane of the page. The purpose of a MEMS optical phase shifting device is to impart a precisely controllable relative optical phase shift on two light beams incident upon it. Several varieties of MEMS device are shown in the figure. Although they have different names, the overall principle of operation is the same for each: an electrical signal causes part of device to move such that the relative propagation distance of two beams incident upon it is changed. (The only exception to this rule is the case of device 402 which is a fixed device and does not move. Its main purpose is as an aid in understanding and analysis for the movable devices. It could also be used to display fixed images or test patterns.)

In FIG. 4 are shown: quarter-wave step surface 402, MEMS ribbon device #1 404, AFM cantilever 406, MEMS ribbon device #2 408, MEMS cantilever device #1 410, MEMS cantilever device #2 412, and MEMS hinge device 414. In each case, two light beams 442 and 444 impinge on the MEMS device. Each device (with the exception of 402 as mentioned above) is capable of moving under the influence of an electrical signal so that light beams 442 and 444 travel different distances upon reflection at the surface of the device. A common feature to all of the devices is that each one modulates a single pixel in a line image by itself. This is in contrast to diffractive devices which rely on two or more MEMS elements to create one pixel of image information.

The operation of MEMS ribbon device #1 404 was described in detail in U.S. Ser. No. 10/904,766 as were the operation of devices 402 and 406. Devices 408, 410, 412, and 414 are similar in operation. Devices 404 and 408 are based on ribbon structures; devices 406, 410, and 412 are based on cantilevers; device 414 is based on a hinge.

MEMS ribbon device #2 408 is similar to MEMS ribbon device #1 404 except that it does not have a middle support for the ribbon. While middle supports are presently preferred as described in U.S. Ser. No. 10/904,766, they are not always necessary. The ribbon in device 408 bends under the influence of an applied electric field. The displacement of the ribbon is greater at the middle compared to the ends. Therefore if light beams, such as light beams 442 and 444, are incident upon the device they will travel different distances upon reflection and a relative phase shift will be imparted to them.

MEMS cantilever devices #1 410 and #2 412 are similar to AFM cantilever device 406. The cantilevers in each device bend under the influence of an applied electric field. Device 406 takes advantage of the fact that the displacement of the cantilever varies along its length. Therefore light beams reflected from the cantilever, such as light beams 442 and 444, travel different distances upon reflection and a relative phase shift is imparted to them. MEMS cantilever devices #1 410 and #2 412 each employ two cantilevers. In device 410 the cantilevers are of equal length while in device 412 the cantilevers are of different lengths. Device 410 has the feature that the cantilevers may be individually controlled by separate electrical signals if desired. Device 412 has the feature that a single control signal deflects the cantilevers different distances because they are of different lengths.

There are also other ways to build pairs of cantilevers that deflect differently under the influence of a common control voltage. As an example, the cantilevers in device 410 or 412 could be made of different materials or unequal thicknesses or widths.

MEMS hinge device 414 comprises a center post with a tilting beam supported from it. The tilting beam is hinged on the center post. As in the other devices and electric field is applied to the device to move a reflective surface, in this case the tilting beam. As the beam tilts, light beams reflected from opposite ends travel different distances and a relative phase shift is imparted to them.

All of the MEMS optical phase shift devices illustrated in FIG. 4, and arrays made from them, share desirable features: only one MEMS element is required per pixel in the line image output from the differential interferometric light modulator, and stationary portions of the devices do not appear in the line image if they are at a common height and therefore do not contribute to imparting a relative phase shift on reflected light beams.

Figure 5:
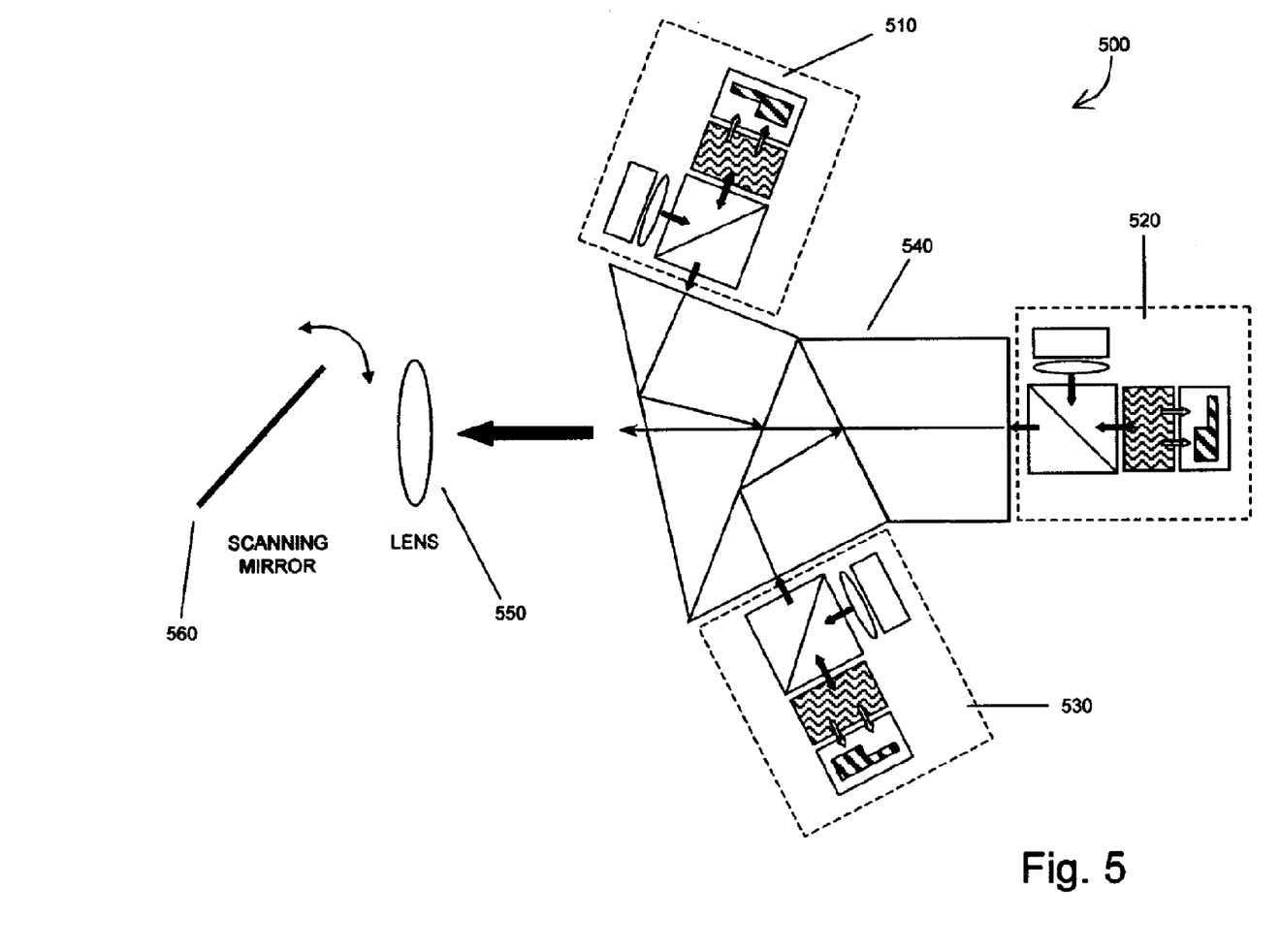
FIG. 5 shows multiple monochrome image display systems combined to make a full color display system.

FIG. 5 shows multiple monochrome image display systems combined to make a full color display system. In FIG. 5 differential interferometric light modulator image display systems 510, 520 and 530 output monochrome line images into Philips color combining prism 540. The monochromatic images are combined in prism 540 which directs the three-color light toward lens 550 and scanning mirror 560. Of course scanning mirror 560 could be replaced with a scanned object or the retina of a viewer as discussed earlier in connection with FIGS. 1 and 1A.

Philips prism 540 is a convenient device for combining monochrome, for example red, green and blue, images into a full color image. However other color combining schemes such as an X-cube also work well.

As one skilled in the art will readily appreciate from the disclosure of the present invention, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

While the invention has been described in connection with what are presently considered to be the most practical and preferred embodiments, it is to be understood that the invention is not limited to the disclosed embodiments and alternatives as set forth above, but on the contrary is intended to cover various modifications and equivalent arrangements included within the scope of the following claims.

What is claimed is:

1. An image display system comprising: a polarizing beam splitter; a polarization displacement device; and, a MEMS optical phase shifting device; wherein, polarized light is directed from the polarizing beam splitter to the polarization displacement device; the polarization displacement device divides the light into parallel beams of orthogonal polarization; and, the MEMS optical phase shifting device imparts a relative phase shift upon the parallel beams.

2. The system of claim 1 wherein the polarization displacement device comprises: a birefringent prism that imparts angular separation on orthogonally polarized components of the polarized light; and, a lens placed such that the polarized components travel parallel to each other between the lens and the MEMS optical phase shifting device.

3. The system of claim 2 wherein the polarization displacement device comprises: a Wollaston, Rochon, or Senarmont prism; and, a lens.

4. The system of claim 1 wherein the polarization displacement device comprises: a walkoff crystal that imparts lateral displacement on orthogonally polarized components of the polarized light.

5. The system of claim 4 wherein the polarization displacement device comprises: a Savart, or modified Savart, plate.

6. The system of claim 1 wherein the MEMS optical phase shifting device comprises: a MEMS ribbon device.

7. The system of claim 1 wherein the MEMS optical phase shifting device comprises: a MEMS cantilever device.

8. The system of claim 1 wherein the MEMS optical phase shifting device comprises: a MEMS hinge device.

9. An image display system comprising: two or more differential interferometric light modulators; and, a color combining prism that combines light from each modulator to form a multicolor line image output.

10. The system of claim 9 further comprising a scanning mirror that scans the line image to form a two-dimensional image.

11. The system of claim 10 further comprising an eyepiece for direct viewing of the two-dimensional image.

12. The system of claim 9 further comprising an object scanned across the line image output.

* * * * *